United States Patent
Cops et al.

(10) Patent No.: US 9,450,788 B1
(45) Date of Patent: Sep. 20, 2016

(54) EQUALIZER FOR HIGH SPEED SERIAL DATA LINKS AND METHOD OF INITIALIZATION

(71) Applicant: Mindspeed Technologies, Inc., Newport Beach, CA (US)

(72) Inventors: Wim F. Cops, Le Rouret (FR); Atul K. Gupta, Aliso Viejo, CA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 0 days.

(21) Appl. No.: 14/706,403

(22) Filed: May 7, 2015

(51) Int. Cl.
 *H04L 25/03* (2006.01)

(52) U.S. Cl.
 CPC ... *H04L 25/03057* (2013.01); *H04L 25/03019* (2013.01); *H04L 25/03159* (2013.01)

(58) Field of Classification Search
 CPC .................. H04L 25/03057; H04L 25/03019; H04L 25/03159
 See application file for complete search history.

(56) References Cited

U.S. PATENT DOCUMENTS

| | | |
|---|---|---|
| 4,849,998 A | 7/1989 | Poklemba |
| 5,194,828 A | 3/1993 | Kato et al. |
| 5,210,712 A | 5/1993 | Saito |
| 5,293,405 A | 3/1994 | Gersbach et al. |
| 5,471,501 A | 11/1995 | Parr et al. |
| 5,963,901 A | 10/1999 | Vahatalo et al. |
| 6,111,712 A | 8/2000 | Vishakhadatta et al. |
| 6,317,062 B1 | 11/2001 | Payer et al. |
| 6,341,360 B1 | 1/2002 | Abdelilah et al. |
| 6,445,662 B1 | 9/2002 | Tonami |
| 7,978,012 B2 | 7/2011 | Wood |
| 8,396,110 B1* | 3/2013 | Hsieh ................ H04L 25/03038 375/229 |
| 2004/0001538 A1* | 1/2004 | Garrett .............. H04L 25/03057 375/229 |
| 2005/0186918 A1 | 8/2005 | Ramet et al. |
| 2006/0001494 A1 | 1/2006 | Garlepp et al. |
| 2007/0280388 A1* | 12/2007 | Torre ....................... H04B 3/23 375/350 |
| 2008/0111597 A1 | 5/2008 | Cranford et al. |
| 2008/0265998 A1 | 10/2008 | Wood |
| 2008/0290953 A1 | 11/2008 | Sandner et al. |
| 2008/0304559 A1* | 12/2008 | Wu .................... H04L 25/03057 375/233 |
| 2009/0141774 A1 | 6/2009 | Araki et al. |

(Continued)

OTHER PUBLICATIONS

Analog & Power, "An Introduction to clock distribution circuits", Alexander Pakosta, Texas Instruments, 2 pages, date unknown, before Dec. 10, 2010.

(Continued)

*Primary Examiner* — Vineeta Panwalkar
(74) *Attorney, Agent, or Firm* — Weide & Miller, Ltd.

(57) ABSTRACT

A system and method for calculating optimal equalizer coefficients during an initialization phase is disclosed. An equalizer system for processing a received signal at a communications receiver comprises several equalizers and adaptation modules. A first equalizer is configured to receive and process a received signal to create a first equalizer output. The first equalizer is active during an initialization phase and active during an operational phase. A second equalizer is configured to receive and process the first equalizer output to create a second equalizer output. The second equalizer is active during an initialization phase and aids in the generation of the first equalizer coefficients, and inactive during an operation phase. A third equalizer is configured to receive and process the first equalizer output to create a third equalizer output such that the third equalizer is inactive during an initialization phase and active during an operation phase.

20 Claims, 5 Drawing Sheets

(56) References Cited

U.S. PATENT DOCUMENTS

2009/0244375 A1    10/2009  Moehlmann et al.
2011/0032013 A1    2/2011   Nelson et al.
2012/0002712 A1*   1/2012   Hayami ........... G11B 20/10009
                                                      375/232
2012/0038400 A1    2/2012   Talaga, Jr.

OTHER PUBLICATIONS

Texas Instruments, Application Report, "Using the CDCL6010 as a Frequency Synthesizer and Jitter Cleaner", Madhu Balasubramanian, SLLA259-Mar. 2007, Copyright © 2007, Texas Instruments Incorporated, 15 pages.

CDC7005, "3.3-V High Performance Clock Synthesizer and Jitter Cleaner", SCAS685J-Dec. 2002-Revised Jul. 2008, Copyright © 2008, Texas Instruments Incorporated, 33 pgs.

P.M Crespo Bofill, G. Shing Liu, C. Ho Wei, Combine Baud-rate timing recovery and adaptive equalization for high rate data transmission in digial subscriber lines. In Comunicaciones de Telefonica y Desarollo, vol. 41, No. 7, Jun. 1993. http://www.tid.es/presencia/publicationes/comsid/esp/articulos/vol41/combi/combi.html.

* cited by examiner

EQUALIZER FOR HIGH SPEED SERIAL DATA LINKS AND METHOD OF INITIALIZATION

1. FIELD OF THE INVENTION

The invention relates to equalizers for communication receivers and in particular to a decision feedback equalizer based receiver for high speed serial data links.

2. RELATED ART

High speed communication links are common through the telecommunication, data communication, networking and electronic industries. Modern communication systems, such as voice, data, video, and other communication devices rely on high speed data communication to exchange data between remote locations or between elements network or communication system.

In traditional decision feedback equalizers (DFE), the initial startup poses a difficult problem for setting the equalizer coefficient values when the channel is unknown and other processing elements in the receivers are operating under fixed constraints. While equalization at all frequencies can be difficult during the startup, the problem is particularly pronounced when the channel to be equalized has a significant loss at the Nyquist frequency.

Figure 1:
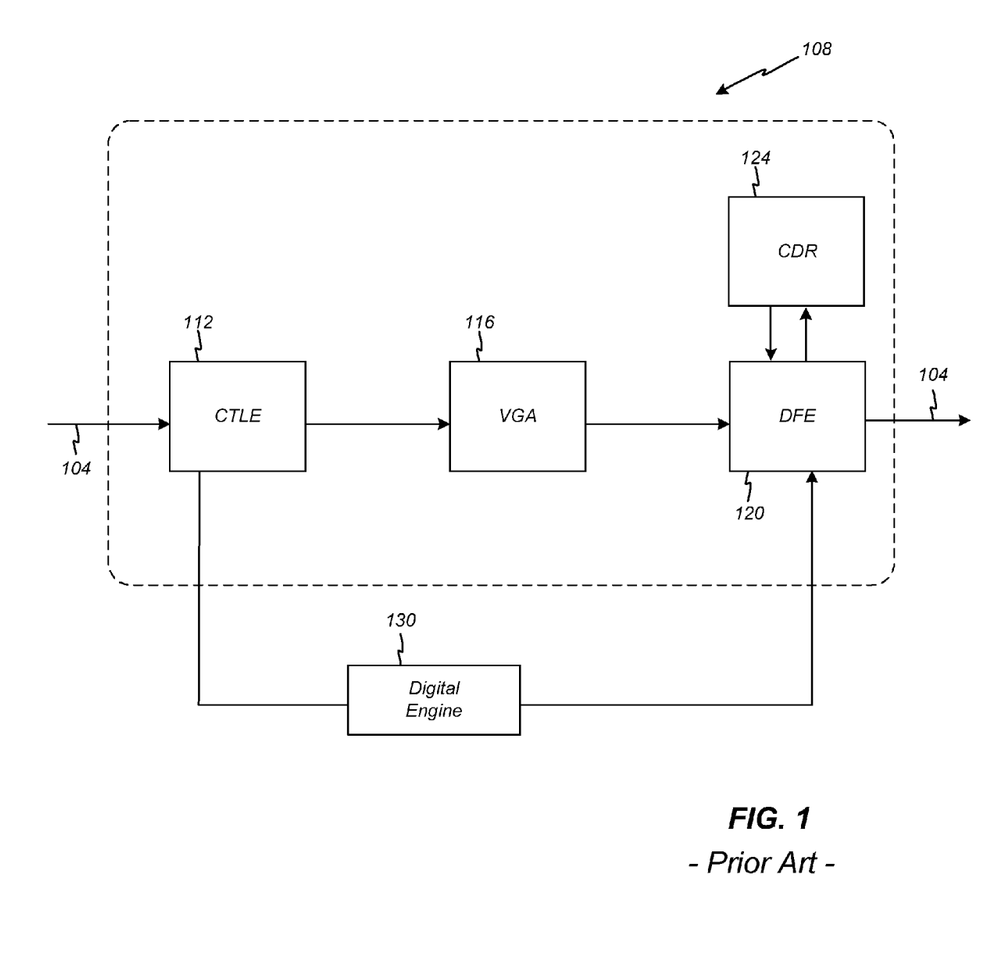
FIG. 1 is a block diagram illustrating a prior art communication receiver equalizer path.

As shown in FIG. 1, a prior art receiver system includes a channel 104 carrying a signal to a receiver 108. The incoming signal is provided to a continuous time linear equalizer (CTLE) 112 which performs equalization on the incoming signal. Additional processing elements or passive elements may be present, but are not shown, such as an analog front end or other devices. The output of the CTLE 112 connects to a variable gain amplifier (VGA) 116 which adjusts the magnitude of the incoming signal to a level suitable for processing by a subsequent decision feedback equalizer (DFE) 120 as shown. The DFE 120 exchanges information with a clock data recovery (CDR) circuit 124. The CDR circuit locks a clock signal to the incoming signal. DFE 120 outputs the equalized received signal for processing by other elements of the receiver, or re-transmission. This forms the receiver chain. Also part of this embodiment is a digital engine 130 that may be part of the receiver or established as a separate element. The digital engine 130 processes the signal or equalizer settings to calculate and distribute filter coefficients for the CTLE 112 and the DFE 120.

During initialization and operation, the CTLE 112 needs to converge and the entire receiver chain needs to make sure that the clock signal can phase lock to the incoming data stream as performed by the CDR circuit 124. This in turn drives a local oscillator, which is part of the CDR circuit 124, to synchronize frequency and phase. One difficulty of prior art systems occurs because the CTLE 112 often converges to a non-optimal solution in the beginning, and needs to adjust its coefficient settings later on, once the DFE taps have converged. This slows the process due to re-initialization and reduces effective bit rates. Because the CTLE 112 and DFE 120 are in series, and both are controlled by a master control unit, such as the digital engine 130, it is difficult to insure correct operation when currently attempting to converge.

For example, due to both the CTLE 112 and the DFE 120 attempting to concurrently equalize the signal and recover the clock, each device's calculated coefficient during training may result in a less than optimal solution. For example, the CTLE 112 may perform inadequate equalization on certain frequency bands, leaving the DFE 120 overwhelmed and unable to fully compensate. This can result in a suboptimal link margin and a high bit error rate. In such case, the system must retrain for new coefficients and again, there is no guarantee that the new solution will be optimal.

Previous solutions may use a reference clock for frequency acquisition and may require a training sequence for DFE tap training. This separate training operation delays data processing of a received signal and requires synchronized training operation. Another proposed solution is to improve convergence accuracy by adding a more powerful digital signal processing (DSP) as the digital engine, which increases power consumption, area requirements, cost and complexity.

The paper entitled "A Multigigabit Backplane Transceiver Core in 0.13-um CMOS With a Power-Efficient Equalization Architecture", Krishna et. al., Journal of Solid State Circuits, December 2005 provides additional details on the prior art systems to aid in understanding of the prior art.

SUMMARY

To overcome the drawbacks of the prior art and provide additional benefits, an equalizer system for processing a received signal at a communications receiver is disclosed. In one exemplary embodiment, a first equalizer is configured to receive and process a received signal according to a first equalizer coefficients to create a first equalizer output. The first equalizer is active during an initialization phase to generate the first equalizer coefficients and active during an operation phase. Also provided is a second equalizer configured to receive and process the second equalizer output to create a second equalizer output which is provided to the first equalizer. The second equalizer is active during an initialization phase, to aid in calculation of the first equalizer coefficients, and inactive during an operational phase. A third equalizer is provided and configured to receive and process the first equalizer output, after calculation of the first equalizer coefficients, to create a third equalizer output. The third equalizer is inactive during an initialization phase and active during an operation phase.

In one embodiment, the first equalizer and the second equalizer are continuous time linear equalizers. In one embodiment the third equalizer is a decision feedback equalizer.

In one configuration the initialization stage may be comprised of the second equalizer, a slicer, and an adaptation module. As such, the slicer may be configured to compare the quantized equalizer output to one of two or more values and the adaptation module may be configured to compare the slicer input to the slicer output as part of the calculation of the first equalizer coefficient and second equalizer coefficient.

During the initialization phase the first equalizer may be configured to equalize a first range of frequencies of the received signal and the second equalizer may be configured to equalize a second range of frequencies of the received signal.

It is further contemplated that during the operational phase the first equalizer is configured to equalize a first range of frequencies of the received signal and the third equalizer is configured to equalize the second range of frequencies of the received signal. In one embodiment, a variable gain amplifier is between first equalizer and the third equalizer to adjust the magnitude of the first equalizer output.

In another embodiment, a signal processing system is provided that is configured to reverse or reduce the effects of a channel on a received signal. In one example embodiment, the system comprises a first linear equalizer configured to receive the signal, and process the signal based on a first coefficient set to create a first linear equalizer output. Also provided is an initialization stage that is only active during an initialization phase for calculation of the first coefficient set. The initialization stage includes a second linear equalizer, a slicer and an adaptation module. The initialization stage is configured to receive and process the first linear equalizer output, based on a second coefficient set to create a second linear equalizer output. The slicer is configured to receive and process the second linear equalizer output to generate a slicer output. The adaptation module is configured to receive and process the second linear equalizer output and the slicer output to generate the first coefficient set and the second coefficient set.

Also provided is a decision feedback equalizer configured to receive and process the first linear equalizer output, or an amplified version of the first linear equalizer output, based on a third coefficient set. The third coefficient set is generated after the first coefficient set is generated and when the first linear equalizer is active and the second linear equalizer is inactive. After the initialization phase and during an operational phase, the initialization stage is inactive.

The system of claim 8, further comprising a phase detector configured to receive the slicer output and clock and data recover circuit configured to communicate with the phase detector and the decision feedback equalizer to time the signal to a clock.

In one configuration, an amplifier is between the first linear equalizer and the decision feedback equalizer and the amplifier is configured to adjust the magnitude of the input to the decision feedback equalizer. During the initialization phase the first linear equalizer may be configured to equalize a first range of frequencies of the received signal and the second linear equalizer may be configured to equalize a second range of frequencies of the received signal. Moreover, during the operational phase the first linear equalizer may be configured to equalize a first range of frequencies of the received signal and the decision feedback equalizer may be configured to equalize the second range of frequencies of the received signal. It is contemplate that either or both of the first linear equalizer and the second linear equalizer are continuous time linear equalizers.

Also disclosed is a method of establishing coefficient values in a signal equalization system. In one exemplary method of operation, prior to processing a data signal, the system enters an initialization phase that includes processing a signal, subject to a first coefficient set, with a first equalizer to generate a first equalizer output and processing the first equalizer output, subject to a second coefficient set, with a second equalizer to generate a second equalizer output. Then, performing a quantization operation on the second equalizer output to generate a quantized signal and processing the second equalizer output and the quantized signal with an adaptation module to generate or update the first coefficient set and the second coefficient set.

The system may then disable at least the second equalizer and process the received signal with the first equalizer, subject to a first coefficient set, to generate the first equalizer output. Processing the first equalizer output, or an amplified version of the first equalizer output occurs to generate a third coefficient set for use by a third equalizer. After establishing the first coefficient set and the third coefficient set, the system enters an operational phase which includes disabling at least the second equalizer and processing the received signal with the first equalizer and the second equalizer to reduce or eliminate the effects of the signal passing through a channel.

In one embodiment, during the initialization phase the first linear equalizer is configured to equalize a first range of frequencies of the received signal and the second linear equalizer is configured to equalize a second range of frequencies of the received signal. Furthermore, in one embodiment, during the operational phase the first linear equalizer is configured to equalize a first range of frequencies of the received signal and the decision feedback equalizer is configured to equalize the second range of frequencies of the received signal.

It is contemplated that either or both of the first equalizer and the second equalizer may be linear equalizers and the third equalizer may be a decision feedback equalizer. In one embodiment, the quantization operation is performed by a slicer. The adaptation module may be configured to calculate the third coefficient set. The step of disabling may further include disabling the quantization operation and the adaptation module during the operational phase.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

To overcome the drawbacks of the prior art and provide additional benefits, a method and apparatus for signal equalization and equalizer path training is disclosed. In addition to the prior art equalization path comprising primarily a first CTLE device and a DFE device in series as shown in FIG. 1, added is a second CTLE device with supporting elements to conduct a first initialization phase with the first CTLE device. During the first initialization phase, the first CTLE device establishes its coefficient settings and the phase and clock of the incoming signal are determined. During a second initialization phase, the established first CTLE device coefficients are fixed and maintained while the DFE device conducts an initialization processes to establish its coefficient values. During, the second initialization phase, the second CTLE device and its associated supporting elements may be disabled. Likewise, during operation of the communication receiver the second CTLE device and its associated supporting elements may be disabled.

Figure 2:
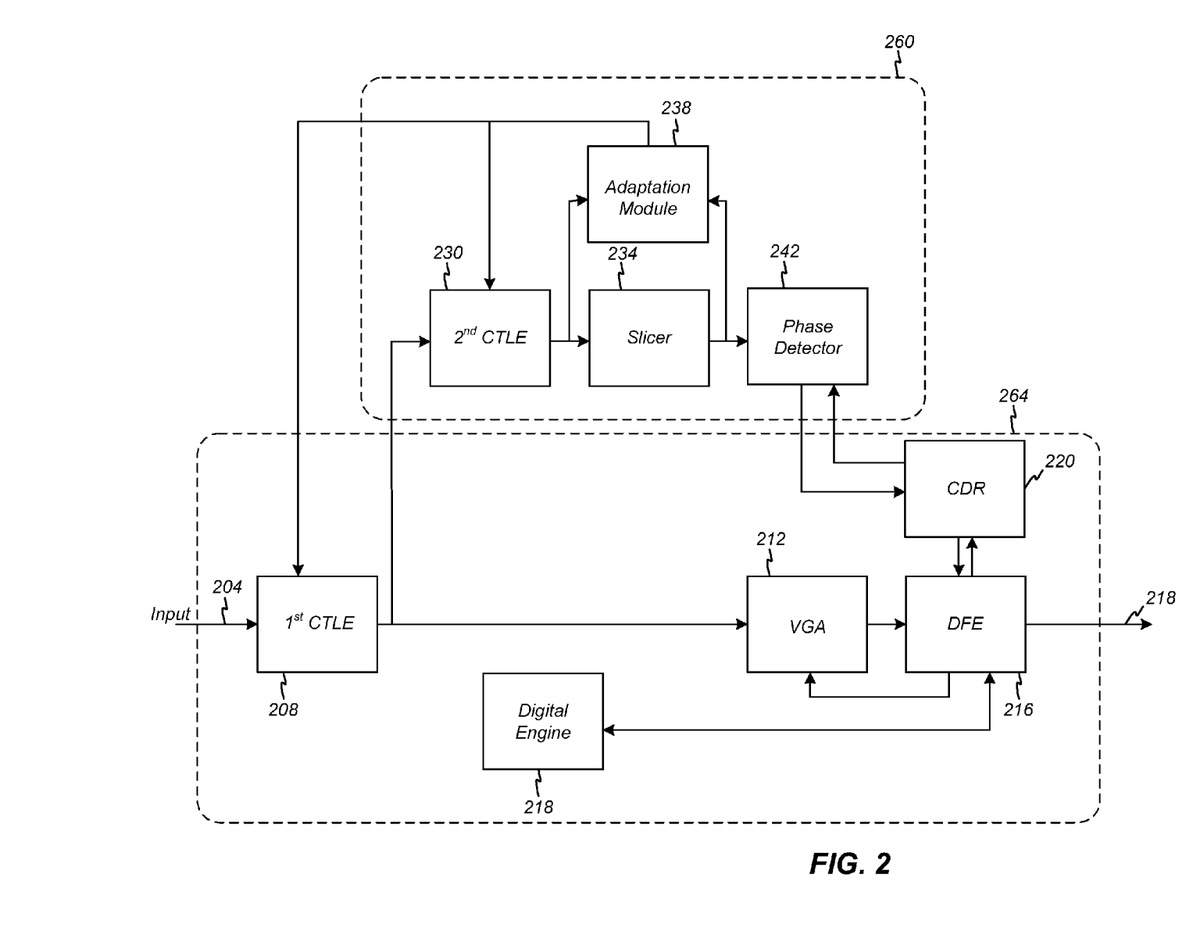
FIG. 2 is a block diagram illustrating an example embodiment of a communication receiver with improved equalizer path.

FIG. 2 is a block diagram illustrating an example embodiment of a communication receiver with improved equalizer path. This exemplary embodiment is discussed in two sections, defined as the initialization stage 260 and an operational stage 264.

Operational Stage

As shown, the incoming signal is provided by the channel 204 to the first CTLE 208. The output of the first CTLE 208 connects to a variable gain amplifier (VGA) 212 and to a second CTLE 230. Both of the first CTLE 208 and the second CTLE 230 rely on coefficient values that control the degree of modification to the received signal at numerous different frequency ranges. Prior to operation, these coefficients must be established through a process commonly referred to as training.

The VGA 212 is a variable-gain or voltage-controlled amplifier and may be an electronic amplifier that varies its gain depending on a control voltage. The VGA 212 provides its output to a decision feedback amplifier (DFE) 216. The DFE 216 is a filter that uses feedback of detected symbols in addition to conventional equalization of future symbols. The DFE 216 may comprise or be replaced by any adaptive equalizer or generalized equalizer that is configured to automatically adapt to time-varying properties of the communication channel. The DFE 216 provides a feedback signal to the VGA 212 as shown and provides a processed or equalized output signal on an output 218. The DFE 216 feedback loop to the VGA 212 allows the VGA to dynamically adjust the magnitude of the VGA output during operation. The CDR provides a clock signal that is locked to the incoming signal.

The DFE 216 also exchanges data with a CDR unit 220. Some digital data streams, especially high-speed serial data streams are sent without an accompanying clock signal. In this case, the receiver generates a clock from an approximate frequency reference, and then phase-aligns to the transitions in the data stream with a phase-locked loop (PLL) that is part of, but not shown, the CDR 220. This process is commonly known as clock and data recovery (CDR) and is understood by one of ordinary skill in the art. The CDR 220 may be configured to perform carrier recovery, which is the process of re-creating a phase-locked version of the carrier. These elements (208, 212, 216) may be collectively referred to as the operational stage and are configured to be operational and active during processing of received signals.

Initialization Stage

As discussed above, the training and initialization of the first CTLE 208 and the DFE 216 present difficulties in the prior art due to the parallel and concurrent training and coefficient calculation of each equalizer 208, 216. To overcome these difficulties and increase accuracy of the equalizer coefficients, an initialization stage 260 is presented. In this example embodiment, the initialization stage includes a second continuous time linear amplifier (CTLE) 230 which receives the output of the first CTLE 208. The output of the second CTLE 230 is presented to a slicer 234 and to an adaptation module 238. The output of the slicer is provided to a phase detector 242 and fed back to the adaptation module 238 as shown. The phase detector 242 communicates with the CDR 220 to exchange clock and phase information. The output of the adaptation module 238 is selectively fed back to the second CTLE 230 and to the first CTLE 208 as shown in FIG. 2 based on the mode of operation, namely, whether the system is in initialization mode or operational mode.

The first and second CTLE 208 and 230 comprise continuous time linear equalizers. In other embodiments, other types of equalizers or filters may be utilized in place of one or both of the CTLEs. Any equalization filter configured vary the amplitude response as a function of frequency may be utilized.

The initialization stage operates during an initialization mode to assist with the system's data timing in relation to a system clock and training of the first CTLE 208. As shown in this exemplary embodiment, the output of the first CTLE 208 also feeds into a second CTLE 230. The second CTLE 230 may be generally similar to, the same as, or different from, the first CTLE 208. The output of the CTLE 230 is provided to both a slicer 234 and an adaptation block 238. The slicer 234 compares its input to one or more known signal values to quantize (make a decision) regarding the input to the slicer in relation to at least one known predetermined signal or symbol values (typically the closest in magnitude or other factor). Thus, the slicer 234 quantizes the input to the closest matching predetermined value based on the comparison. The output of the adaptation block 238 is fed back to the second CTLE 230 and to the first CTLE 208. Based on a comparison and analysis of the input to the slicer 234 and the output of the slicer, the adaptation block 238 is configured to determine the error on a frequency by frequency basis, or other basis, and set and adapt the coefficients of the first CTLE 208 and the second CTLE 230.

The output of the slicer 234 feeds into the phase detector 242 and is also provided as an input to the adaptation block 238 as shown. A phase detector 242 or phase comparator is a frequency mixer, analog multiplier or logic circuit that generates a voltage signal which represents the difference in phase between two signal inputs. It may be an element of the phase-locked loop (PLL) and is used to compare or detect the phase between signals, such as an input signal and a reference signal, such as a clock. The phase detector, as well as the other elements of the system, may be configured as either analog devices, digital devices, or mixed signal devices.

The phase detector 242 exchanges data with the clock data recovery circuit 220 as shown, which was described above as part of the operational stage of the system of FIG. 2. The phase detector 242 and CDR circuit 220 operate together to phase align the clock to the incoming data.

Initialization Mode

During an initialization mode, the operational stage, with the possible exception of the clock data recovery circuit 220, is not operational. In particular, the DFE 216 is not attempting to establish its coefficient values, or the coefficient values are set to a default initial value. Instead, when the initialization stage is active, the first CTLE 208 and the second CTLE 230 operate concurrently to establish the coefficient values for each linear equalizer 208, 230. In particular, the input signal is processed by the first CTLE 208 and the output of the first CTLE is presented to the second CTLE 230, which also processes its received signal. The slicer 234 performs a decision operation on the resulting equalized signal, and the adaptation block 238 determines the difference between the slicer input and the slicer output to establish or modify the coefficient values for both of the first CTLE 208 and the second CTLE 230 using the feedback path from the adaptation block 238 to the CTLEs.

In one embodiment the first CTLE 208 and the second CTLE 230 are each configured to perform a unique or different signal equalization roles. For example, in one embodiment the first CTLE 208 is configured or assigned to equalize the channel effects in the lower portions of the frequency bands while the second CTLE 230 is configured or assigned to equalize the channel effects in the upper portions of the frequency bands. In other embodiments, these respective roles are reversed. In other embodiments, each equalizer may be assigned overlapping, or other frequency band equalization tasks. It is also contemplated that the equalizers 208, 230 may be assigned other equalization roles.

By assigning different equalization tasks to each equalizer 208, 230, is thus dedicated to a particular role assignment and the complexity of equalizer training to establish the coefficient value is reduced. This task may thus be accomplished using the adaptation block 238, and complex, power and space consuming digital engines may be avoided. In addition, because its equalizer 208, 230 is assigned a particular role or goal, the behavior and coefficients for each equalizer may be optimized for that particular assigned role or goal. This is an improvement over the prior art when the first CTLE 208 and the DFE 216 were concurrently trained and the role of each equalizer overlapped leading to a complex process and un-optimized results.

During the optimization mode, the phase detector 242 and the clock data recovery circuit 220 also establish the proper timing between the data and the reference clock.

After the first CTLE coefficients are established, and the clock to data timing is locked using the clock data recovery circuit 220, the initialization stage 260 may be disabled. The signal output from the first CTLE 208 is presented to (or continues to be presented) to the VGA 212, where variable amplification occurs, and then to the DFE 216.

Figure 4:
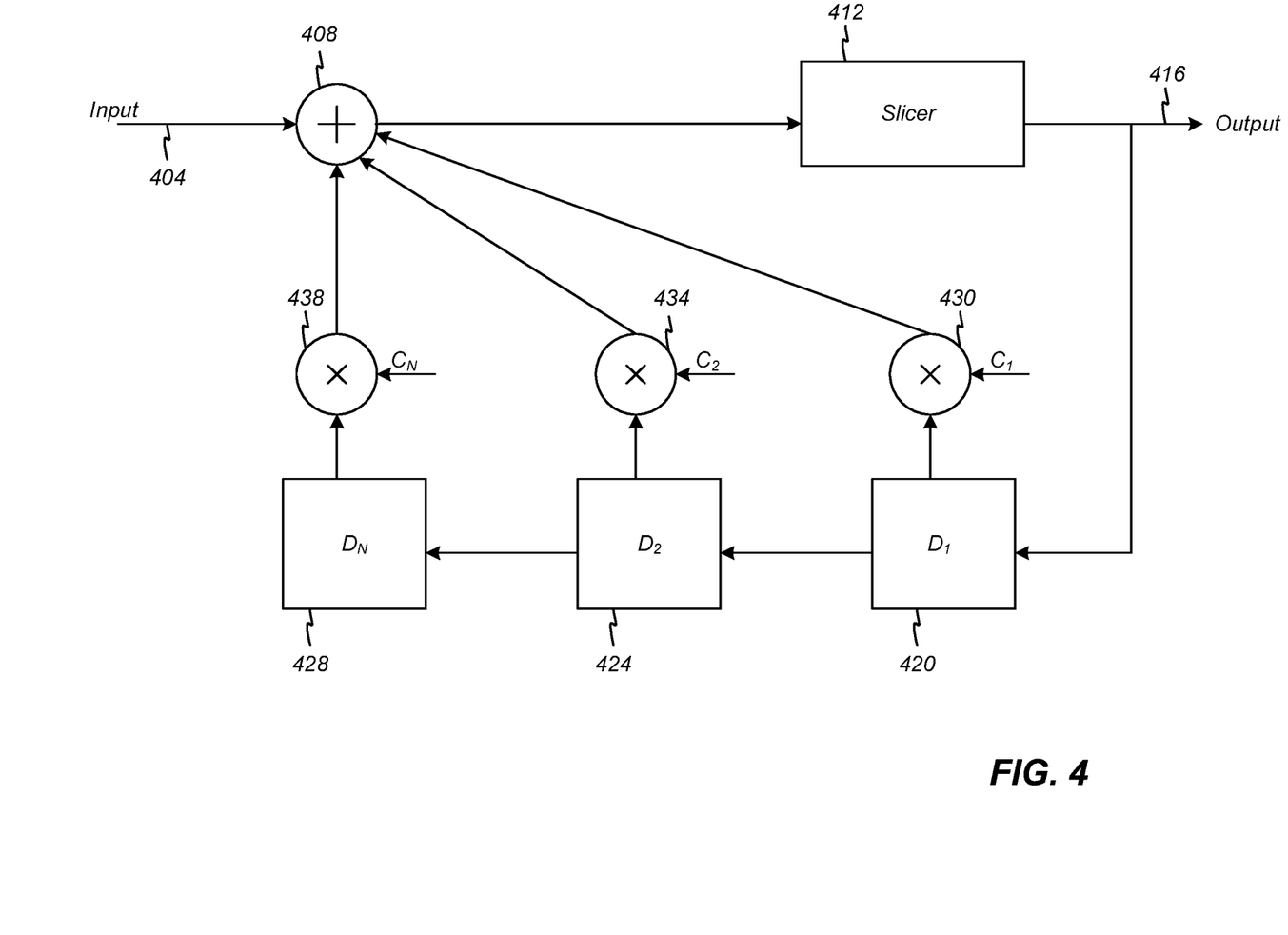
FIG. 4 is a block diagram illustrating an example embodiment of an exemplary decision feedback equalizer.

The DFE 216 initiates a training sequence to establish the coefficient values in the DFE. An exemplary DFE is shown in FIG. 4. DFE training processes are generally known in the art and not described in detail herein. The training of the DFE coefficients is able to occur accurately, with minimal processing requirements, and to an optimal solution, because the first CTLE has already converged to an optimal solution. Thus, during the second phase of the training, when the DFE 216 is calculating the coefficient values, the process is simplified because instead of both of the first CTLE 208 and the DFE attempting to concurrently converge to optimal coefficients, now only the DFE is converging its coefficients, which reduces complexity and results in an optimal solution for the DFE equalization. As stated above, the first and second CTLE 208, 230 were each assigned a particular role or equalization task for the incoming signal. Thus, the DFE equalization role is defined as a complement to the first CTLE 208 and thus, the frequencies band to be equalized by the DFE are known, which simplifies DFE coefficient calculation. The output signal from the DFE 216 is presented on an output terminal 218. Another advantage to this method and system is that the local clock is phase aligned when the DFE starts training.

In alternative embodiment, the coefficients from the second CTLE 230 are presented to the DFE to preload the DFE with a default coefficient set. Alternatively, due to the differences between the CTLE and a DFE type equalizers, the coefficient from the second CTLE 230 are first processed to translate or modify the second CTLE to a format or magnitude suitable for use by the DFE.

Operational Mode

Figure 3:
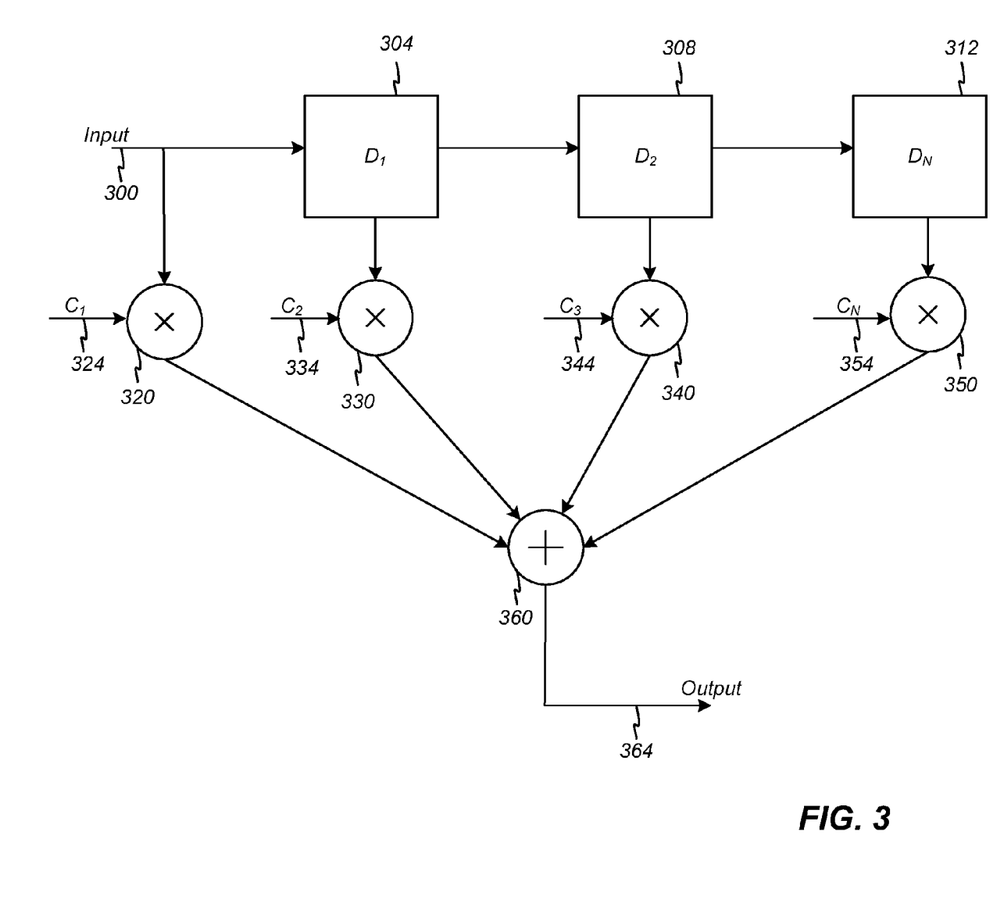
FIG. 3 is a block diagram illustrating an example embodiment of an exemplary continuous time linear equalizer.

An operational mode is entered after initialization and training of the equalizers. During the operational stage, the initialization stage is disabled to reduce power consumption, but it is contemplated that it may remain partially or periodically operational to maintain and store the second CTLE coefficients, such as for a rapid restart or retraining operation. During operation, a signal received at the input 204 is processed by the first CTLE 208 to reverse the effects of the channel 204. The coefficients of the first CTLE 208 perform signal modification (equalization) at each frequency based on coefficient values to equalize the received signal to account for or reverse the effects of the channel up the signal. CTLE operation is known by one of ordinary skill in the art and is not discussed in detail herein. FIG. 3 illustrates one exemplary CTLE device.

After equalization, by the CTLE 208, of the signal received at input 204, the VGA 212 adjusts the magnitude of the first CTLE output signal to a level suitable for processing by the DFE 216. The DFE 216 performs adaptive signal equalization on the signal from the VGA 212. Like a CTLE, the DFE includes coefficients that define the amount of signal modification that occurs at different frequency bands of the signal undergoing processing.

FIG. 3 is a block diagram illustrating an example embodiment of an exemplary continuous time linear equalizer. This is but one possible embodiment of the continuous time linear equalizer (CTLE) and it is contemplated that there are other configurations, designs, or types of linear equalizers that may be utilized in the various embodiments shown and described herein. In addition, other types of CTLEs may be used in the one or more different embodiments of the present innovation, such as but not limited to MMSE equalizers, zero forcing equalizers, adaptive equalizers, FFE equalizers or any other type equalizer.

In this example configuration, an input 300 connects to a first delay 304 and to a multiplier 320 as shown. The first delay 304 has an output that connects to a second delay 308. The second delay 308 has an output that connects to one or more additional delays up to an Nth delay 312.

The multiplier 320 also receives a coefficient $C_1$ on input 324. The output of the multiplier 320 feeds into a summing unit 360. The output of the first delay 304 feeds into a multiplier 330. The multiplier 330 also receives a coefficient $C_2$ on input 334. The output of the second delay 308 feeds into a multiplier 340. The multiplier 340 also receives a coefficient $C_3$ on input 344. The output of the last delay 312 feeds into a multiplier 350. The multiplier 350 also receives a coefficient $C_N$ on input 354.

The output of each multiplier 320, 330, 340, 350 feeds into the summing unit 360. The summing unit 360 provides the resulting summed signal on an output 364.

In operation, a signal to be equalized is presented on input 300 to the delay 304 and the multiplier 320. The multiplier calculates the input signal by a coefficient value $C_1$. The output of the multiplier 320 is presented to the summing unit 360. The first delay 304 establishes a time delay in the signal and presents the delayed signal to the second delay 308 and the multiplier 330. The coefficient $C_2$ is multiplied by the signal presented to the multiplier 340 while the second delay 308 delays the received signal. The output of the multiplier 340 is summed with the other multiplier outputs in the summing unit 360. The output of the second delay unit 308 is multiplied by the coefficient $C_3$ and delayed by one or more additional delays until the Nth delay 312 delays the signal and presents the output of an Nth multiplier where it is multiplied by a Nth coefficient and presented to the summing unit 360. The output of the summing unit 360 is the output of the CTLE.

By the coefficient values $C_1, C_2, C_3, \ldots CN$, the input signal is modified on a frequency basis, or other basis, to modify the received incoming signal to account for one or more distorting effects of the transmission process such as passage through the channel. A controller, processor, or control logic (not shown), may set the coefficient values, and during operation the coefficient values may be adjusted in response to changes in the channel.

FIG. 4 is a block diagram illustrating an example embodiment of an exemplary decision feedback equalizer. This is but one possible embodiment of the decision feedback equalizer (DFE) and it is contemplated that there other configurations, designs, or types of feedback equalizers that may be utilized in the various embodiments shown and described herein. In addition, other types of DEFs may be used in the one or more different embodiments of the present innovation, such as but not limited to, partial response DFEs or half/quarter rate DFEs.

In this example embodiment, an input terminal 404 carries and provides an input signal to a summing junction 408. The summing junction 408 receives other inputs as described below, sums the inputs, and presents the resulting to a slicer 412. The slicer 412 compares the summing junction output 408 to one or more known signal values to quantize or make a decision regarding the output of the summing junction in relation to at least one known signal or symbol values (typically the closest in magnitude or other factor). Thus, the slicer 412 quantizes the slicer input to the closest matching predetermined value based on the comparison. The output of the slicer 412 is presented as an output signal on the output terminal 416 and as a feedback signal to a first delay 420. The output of the first delay 420 comprises a delayed signal and is presented to a multiplier 430 and a second delay 424. The multiplier 430 multiplies the signal from the first delay 420 by a coefficient $C_1$ and presents the resulting value to the summing junction 408.

The second delay 424 delays the signal from the first delay to an Nth delay 428 and to a second multiplier 434. The second multiplier 434 multiplies the signal from the second delay 424 by a coefficient value $C_2$. The resulting signal is presented to the summing junction 408. The Nth delay 428 delays the signal from the second delay 424 and presents the resulting delayed signal to an Nth multiplier 438, which in turn multiplies the received signal by an Nth coefficient. The output of the multiplier 438 is presented to the summing junction 408. In this example embodiment, the inputs from the multipliers are presented as negative signals to the summing junction 408. In FIGS. 3 and 4 N may be a whole number.

In operation, the output of the slicer 412 is processed by the delays and the multipliers based on the coefficient values to modify or equalize the received signal using a feedback mechanism to modify the incoming signal. Based on the coefficient values $C_1, C_2, \ldots C_N$, the input signal is modified on a frequency basis, or other basis, to modify the received incoming signal prior to processing by the slicer to account for one or more effects of the transmission process, such as the effects of the channel. A controller, processor, or control logic (not shown), may set the coefficient values and during operation the coefficient values may be adjusted in response to changes in the channel.

Figure 5:
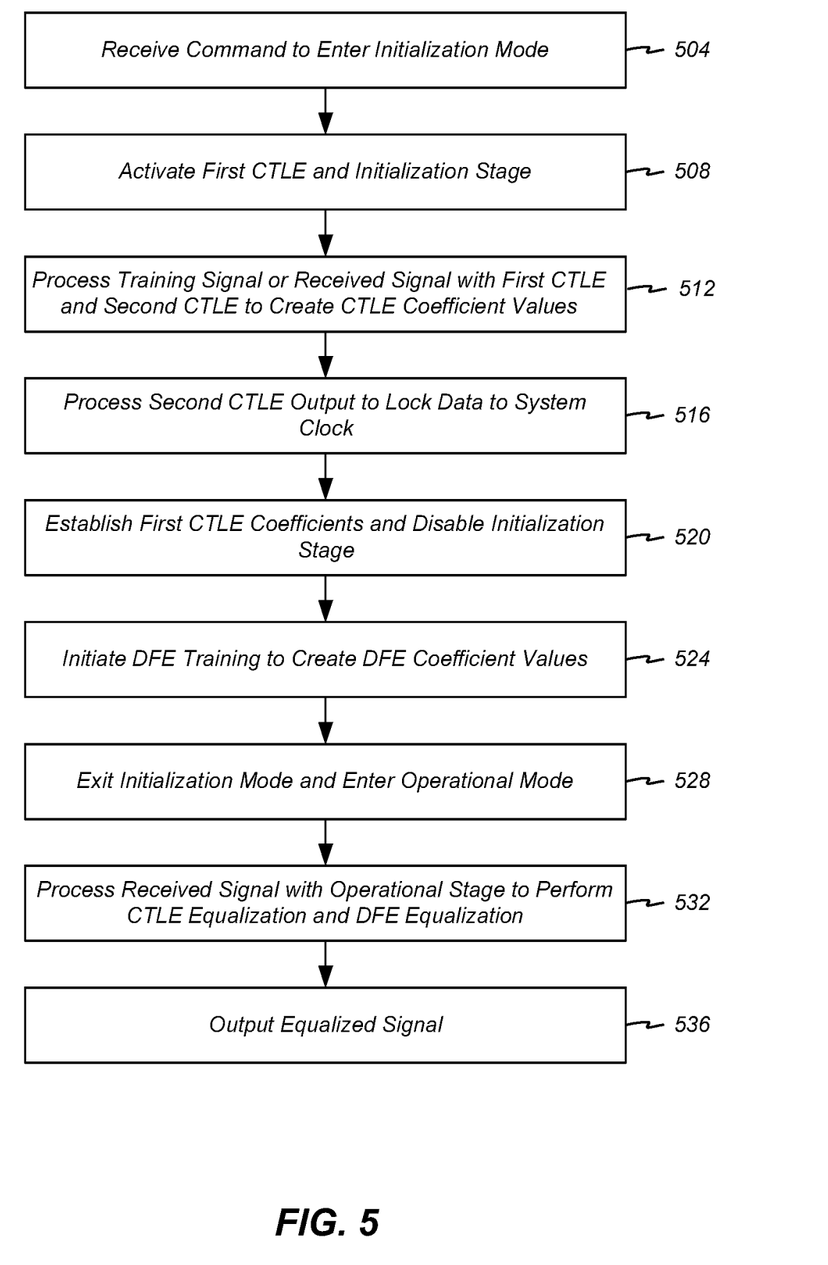
FIG. 5 illustrates an operational flow diagram of an exemplary method of coefficient generation and operation.

FIG. 5 illustrates an operational flow diagram of an exemplary method of operation including system start-up and during operation. This is but one possible method of equalizer coefficient generation and one of ordinary skill in the art may arrive at other embodiments without departing from the scope of the claims.

These steps may occur at start-up, after changes to the channel, periodically, or in response to an input or sensed event, such as an increase in bit error rate. At a step 504 the operation receives a command to enter an initialization mode. Upon receiving such a command, the operation advances to step 508 and activates the first CTLE and the initialization stage as described above. Then at a step 512 the operation processes a training signal or a received signal with the first CTLE and the second CTLE that is part of the initialization stage as described above. The initialization processing generates coefficient values for the first CTLE and the second CTLE using the adaptation block or other mechanism.

At a step 516, the initialization stage processes the second CTLE output to lock the incoming signal (data) stream to a system clock to establish timing and phase lock. During this process, at a step 520, the coefficient values for the first CTLE are established based on parameters or pre-defined rules for the equalization tasks to be performed by the first CTLE and the second CTLE. The parameter or rules may be based on frequency bands or edge energy. The initialization stage is disabled in a step 520 upon the generation of the coefficients for the first CTLE device and locking to incoming data to the clock signal. Optionally, all or a portion of the initialization stage may be disabled after generation of the first CTLE coefficients.

At a step 524, the operation initiates training of the DFE to establish coefficient values for the DFE. During training of the DFE the first CTLE are fixed, and is active and performing equalization on a training signal or a received signal, thereby allowing the DFE to focus on remaining equalization tasks. This reduces the complexity of DFE coefficient generation and establishes an optimal solution for the DFE coefficients which compliments the CTLE operation. At a step 528, the system exits the initialization mode and enters operational mode.

At a step 532 in operational mode, the system processes the received signal with the operational stage through the first CTLE and the DFE to perform equalization that reverses or reduces the effects of the channel on the received signal. At a step 536, the received signal is output for use by subsequent system or retransmission.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. An equalizer system for processing a received signal at a communications receiver comprising:
   a first equalizer configured to receive and process a received signal according to first equalizer coefficients to create a first equalizer output, the first equalizer active during an initialization phase to enable generation of the first equalizer coefficients and also active during an operational phase;
   a second equalizer configured to receive and process the first equalizer output to create a second equalizer output which is provided to the first equalizer, the second equalizer active only during the initialization phase, to aid in calculation of the first equalizer coefficients, and inactive during the operational phase; and
   a third equalizer configured to receive and process the first equalizer output, after calculation of the first equalizer coefficients, to create a third equalizer output, the third equalizer inactive during the initialization phase and active during the operational phase.

2. The system of claim 1, wherein the first equalizer and the second equalizer are continuous time linear equalizers.

3. The equalizer of claim 1, wherein the third equalizer is a decision feedback equalizer.

4. The system of claim 1, further comprising the initialization stage comprised of the second equalizer, a slicer, and an adaptation module, the slicer configured to compare the quantize the second equalizer output to one of two or more values to form a slicer output and the adaptation module configured to compare the slicer input to the slicer output as part of the calculation of the first equalizer coefficients and the second equalizer coefficient.

5. The system of claim 1, wherein during the initialization phase the first equalizer is configured to equalize a first range of frequencies of the received signal and the second equalizer is configured to equalize a second range of frequencies of the received signal.

6. The system of claim 5, wherein during the operational phase the first equalizer is configured to equalize the first range of frequencies of the received signal and the third equalizer is configured to equalize the second range of frequencies of the received signal.

7. The system of claim 1, further including a variable gain amplifier between first equalizer and the third equalizer to adjust the magnitude of the first equalizer output.

8. A signal processing system configured to reverse or reduce the effects of a channel on a received signal, the system comprising:
a first linear equalizer configured to receive and process the received signal based on a first coefficient set to create a first linear equalizer output;
an initialization stage, that is only active during an initialization phase for calculation of the first coefficient set, the initialization stage comprising:
a second linear equalizer configured to receive and process the first linear equalizer output, based on a second coefficient set to create a second linear equalizer output;
a slicer configured to receive and process the second linear equalizer output to generate a slicer output;
an adaptation module configured to receive and process the second linear equalizer output and the slicer output to generate the first coefficient set and the second coefficient set;
a decision feedback equalizer configured to receive and process the first linear equalizer output, or an amplified version of the first linear equalizer output, based on a third coefficient set, the third coefficient set generated after the first coefficient set is generated and when the first linear equalizer is active and the second linear equalizer is inactive, such that after the initialization phase and during an operational phase, the initialization stage is inactive.

9. The system of claim 8, further comprising a phase detector configured to receive the slicer output and a clock and data recovery circuit configured to communicate with the phase detector and the decision feedback equalizer to time the signal to a clock.

10. The system of claim 8, further comprising an amplifier between the first linear equalizer and the decision feedback equalizer, the amplifier configured to adjust the magnitude of the first linear equalizer input.

11. The system of claim 8, wherein during the initialization phase the first linear equalizer is configured to equalize the first range of frequencies of the received signal and the second linear equalizer is configured to equalize a second range of frequencies of the received signal.

12. The system of claim 11, wherein during the operational phase the first linear equalizer is configured to equalize a first range of frequencies of the received signal and the decision feedback equalizer is configured to equalize the second range of frequencies of the received signal.

13. The system of claim 8, wherein either or both of the first linear equalizer and the second linear equalizer are continuous time liner equalizers.

14. A method of establishing coefficient values in a signal equalization system comprising:
prior to processing a data signal, entering an initialization phase, and performing the following:
processing a signal, subject to a first coefficient set, with a first equalizer to generate a first equalizer output;
processing the first equalizer output, subject to a second coefficient set, with a second equalizer to generate a second equalizer output;
performing a quantization operation on the second equalizer output to generate a quantized signal;
processing the second equalizer output and the quantized signal with an adaptation module to generate or update the first coefficient set and the second coefficient set;
disabling at least the second equalizer and processing the data signal with the first equalizer, subject to the first coefficient set, to generate the first equalizer output;
processing the first equalizer output, or an amplified version of the first equalizer output, to generate a third coefficient set for use by a third equalizer; and
after establishing the first coefficient set and the third coefficient set, entering an operational phase, the operational phase including the following:
disabling at least the second equalizer;
processing the data signal with the first equalizer and the second equalizer to reduce or eliminate the effects of the data signal passing through a channel.

15. The method of claim 14, wherein during the initialization phase the first equalizer is configured to equalize the first range of frequencies of the data signal and the second linear equalizer is configured to equalize a second range of frequencies of the data signal.

16. The method of claim 15, wherein during the operational phase the first linear equalizer is configured to equalize a first range of frequencies of the data signal and the decision feedback equalizer is configured to equalize the second range of frequencies of the data signal.

17. The method of claim 14, wherein either or both of the first equalizer and the second equalizer are linear equalizers and the third equalizer is a decision feedback equalizer.

18. The method of claim 14, wherein the quantization operation is performed by a slicer.

19. The method of claim 14, wherein the adaptation module calculates the third coefficient set.

20. The method of claim 14, wherein disabling further includes disabling the quantization operation and the adaptation module during the operational phase.

* * * * *